Figure 1:
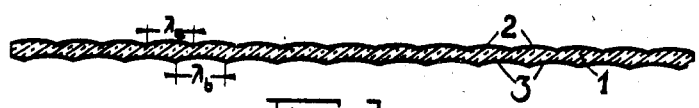

June 13, 1944.  D. GABOR  2,351,034
OPTICAL SYSTEM COMPOSED OF LENTICULES
Filed Aug. 3, 1940  2 Sheets-Sheet 1

Inventor
Dennis Gabor
By Stone, Boyden & Mack
Attorneys

June 13, 1944. D. GABOR 2,351,034
OPTICAL SYSTEM COMPOSED OF LENTICULES
Filed Aug. 3, 1940   2 Sheets-Sheet 2
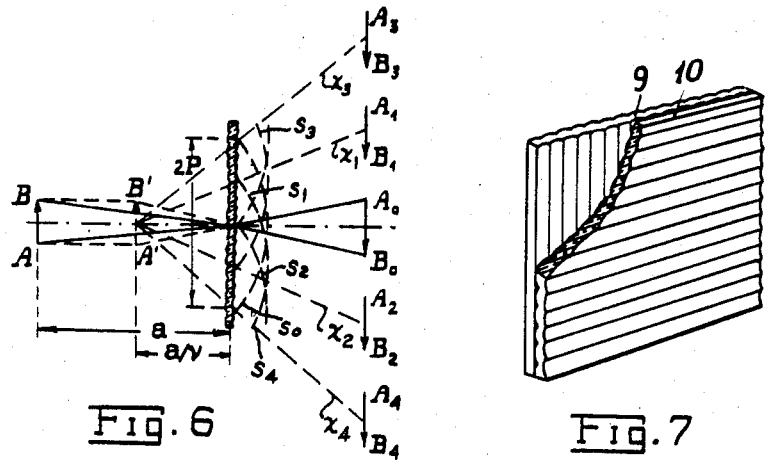
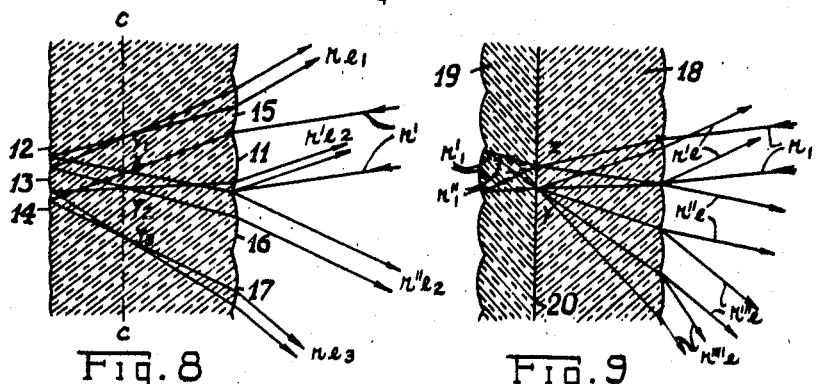
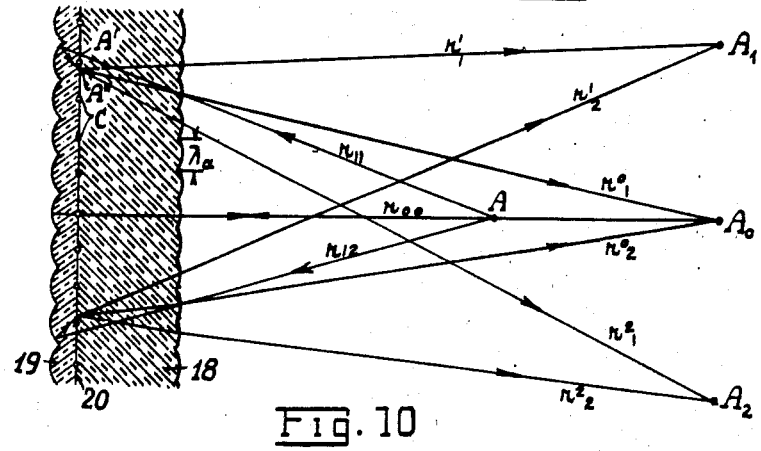
Inventor
Dennis Gabor
By Stone, Boyden & Mack
Attorneys Patented June 13, 1944

2,351,034

UNITED STATES PATENT OFFICE 2,351,034

OPTICAL SYSTEM COMPOSED OF LENTICULES

Dennis Gabor, Rugby, England

Application August 3, 1940, Serial No. 350,805
In Great Britain May 3, 1940

1 Claim. (Cl. 88—1)

This invention relates to improvements in optical systems composed of lenticules, such as may be produced by arranging a large number of lenses in arrays or in two dimensional patterns, or by embossing plates or sheets of transparent material with regular sequences of impressions with suitable curvature. More particularly the invention relates to systems of lenticules, arranged in such a way that by their combination they produce optical effects similar to the effects which may be produced by lenses or mirrors with dimensions very large against the dimensions of the individual lenticules.

In its basic form the invention consists of two systems of cylindrical lenticules in two planes parallel to one another. In each of the said planes the cylindrical lenticules form regular arrays, parallel to the same direction, but the spacing of two adjacent lenticules, to be called the period, is different in the two planes. Such a system can be produced e. g. by embossing both sides of a transparent sheet with parallel cylindrical impressions of different period, or by joining together two lenticular sheets. The two part-systems must satisfy a certain optical condition. If we call "inner focal lines" the lines in which light falling at right angles on the surface of said sheet is united in the medium of the sheet material, we can express this condition as follows: The inner focal lines of the lenticules on both sides of the sheet must be contained in the same plane.

Combinations of two aligned lenses with coinciding inner focal points or lines are known under the name "afocal combinations." These have the property, that a parallel bundle of light entering through one lens will leave the other again in a parallel bundle, though not necessarily parallel with the first. Combinations of two systems of lenticules of equal period and registering with one another in such a way that every lenticule forms with the opposite an afocal pair are also known. These may be termed "afocal plates." It is however the characteristic feature of the present invention that the periods of both sides are different, so that the focal lines of both sides although contained in the same plane do not in general coincide with one another. Systems according to the invention with different periods on both sides exhibit novel and useful properties which are absent in systems in which the periods are equal.

It will be demonstrated in the following specification that double sided lenticular sheets which satisfy the above stated optical condition and have periods which are nearly but not exactly in an integer relation to one another exhibit an optical behaviour very similar to that of large cylindrical lenses. In general we could produce the same optical effects by substituting a finite number of overlapping large lenses, which may be termed "superlenses." This may be understood in the following sense: If parallel light falls perpendicularly on a double-sided lenticular sheet as described, it will be united on the other side in a number of lines, to be called "superfocal lines" parallel to the lenticule axes. The number of these lines will be in general much smaller than the number of the lenticules in the plate. Under certain conditions there is only one super-focus. We could therefore replace the sheet by a number of lenses, each having a focal line coinciding with one of the superfocal lines. The difference is only that whereas in the case of an—ideal—lens the focal line is absolutely sharp, in the case of a superlens it will have in general a thickness of the order of a "period." The superfocal "lines" are really "cross sections of minimum confusion" in which the bundles leaving the lenticules intersect. As however the lenticules themselves are very narrow, under certain conditions the "superlenses" may approach the optical perfection of ordinary lenses. "Super" is not meant to denote perfection, but is used in a similar sense as the term "superlattice" in crystallography.

If instead of cylindrical lenticules we use concentric toroidal lenticules, we obtain the equivalent of large toroidal or ordinary lenses. These can be however produced more simply according to the invention, by crossing at right angles two equal cylindrically lenticulated plates as described. The equivalent of large cylindrical mirrors can be produced by making one side of the double-sided lenticular sheet reflecting. In this case we must modify the above optical condition in such a way that the axes of curvature of the reflecting lenticules must be contained in the same plane as the inner foci of the transparent side. We can also produce a "supermirror" by backing a "superlens" with an ordinary mirror. Spherical "supermirrors" can be produced by crossing at right angles a cylindrical "supermirror" and a cylindrical "superlens."

As compared with large ordinary lenses or mirrors the lenticular systems according to the invention have several advantages. Large lenses must have considerable thickness, either in the middle or at the edges. The lenticular plate on the other hand is comparatively very thin, and has everywhere the same thickness. There is little advantage in making up large lenses of smaller parts, as each part has to be ground or moulded in a special mould. Lenticular "superlenses" on the other hand can be made up of small parts with only two moulds, which have only to be shifted a little relatively to one another in moulding the different parts of the lens. They can be produced e. g. by rolling a sheet of a transparent plastic material between two suitably embossed rollers, geared together. The small thickness is also an advantage if the lens is to be used e. g. for ultraviolet or infrared radiation, in which case the loss through absorption may be considerably reduced. Lenticular plates according to the invention may be used with particular advantage where no great perfection of the lens is required, e. g. for large condenser lenses, lighthouses, etc.

Figure 2:
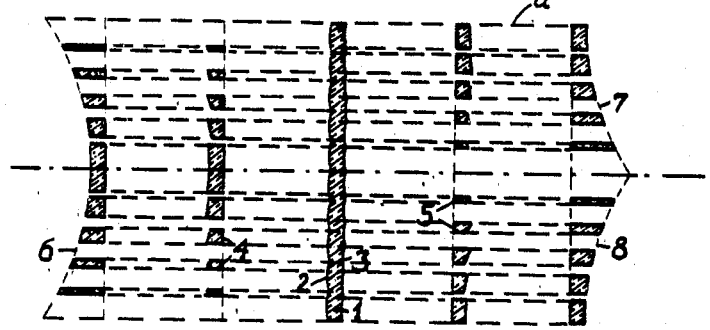
Figures 3, 4:
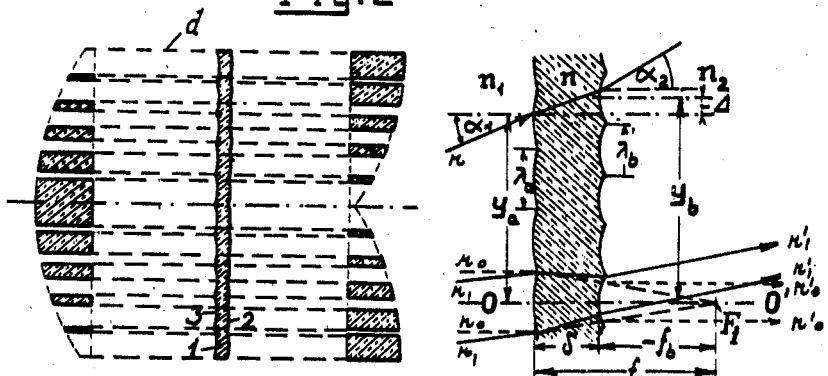

In the accompanying drawings Fig. 1 is a simple example of a lenticular system according to the invention. Figs. 2 and 3 are diagrams, containing an elementary explanation of the optical effects of said systems.

Figure 5:
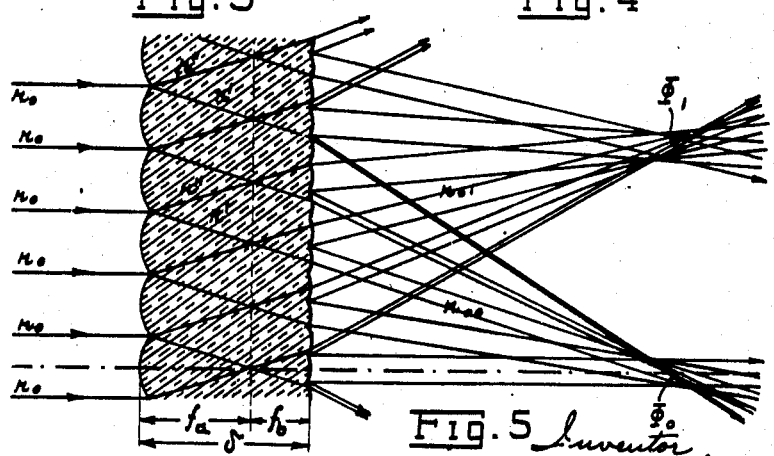

Fig. 4 illustrates the optical condition, to be satisfied by the lenticule systems according to the invention, and the symbols used in their theory. Fig. 5 illustrates the convergence of parallel light produced by a lenticular plate. Fig. 6 shows the system of "superlenses" which may be substituted for a lenticular plate to imitate its optical properties.

Fig. 7 is a combination of two lenticular plates according to the invention with crossed lenticules, which produces effects similar to large ordinary lenses.

Fig. 8 is a lenticular mirror according to the invention, i. e. a double-sided lenticular plate one face of which is made reflecting. Fig. 9 is the same with a diffusing surface introduced in the plane of the inner foci. Fig. 10 illustrates the imaging of a point by a "supermirror."

Fig. 1 shows the simplest example of a lenticular system according to the invention. A transparent sheet 1, which may be made e. g. of glass or of a transparent plastic material is embossed on both sides with cylindrical impressions 2 and 3. Of these 2 is convex and 3 concave, but both have the same curvature radius, supposed to be very large compared with the thickness of the sheet. This simplifying assumption has been made in order to be able to give an elementary demonstration of the optical properties of the system, before proceeding to more complicated cases. The periods $\lambda_a$ and $\lambda_b$ are different, so that the lenticules are progressively shifted relatively to one another, like the division marks in a vernier.

Fig. 2 is a simple diagrammatic explantion of this system. The periods are chosen in the ratio $\lambda_a:\lambda_b=6:5$. The dividing lines register in the axis and at the two edges, but not between them. By drawing all the dividing lines $d$ we divide up the sheet in such a way, that in each of the sections so formed one lenticular surface on one side is opposed to one only on the other side. As both surfaces have the same curvature and the thickness is supposed to be very small compared with the curvature radius, the lens effects cancel one another. Therefore each of these sections is optically equivalent to a prism. In Fig. 2 the equivalent prisms have been constructed in such a way that starting from the axis every odd section is shifted to the left, and every even section to the right. One face of every section is straightened out and aligned, by this the other face becomes also straight. We obtain in this way two systems 4 and 5 of prisms. In the system 4 the prism angle increases linearly with the distance from the axis, in the system 5 the angle has the opposite sign and increases linearly with the distance from the edges. The prisms 4 form therefore a—cylindrical—prismatic lens, also known as Fresnel-lens, with the difference that there are gaps in it. We can immediately transform it into an equivalent ordinary cylindrical— more exactly: parabolical—dispersing lens 6, which has everywhere the same angle between opposite parts of its two faces, as the corresponding part of 4. Again the curvature radius of this substitute lens or "superlens" turns out large compared with the thickness, so that we can neglect the thickness in the first approximation. Similarly 5 can be represented by two cylindrical dispersing lenses, which are shifted relatively to 6 upwards and downwards by the "full period," i. e. by the distance after which the pattern is repeated. In our case this is $5\lambda_a=6\lambda_b$. The lenses 7 and 8 have the same curvature as the lens 6.

We see therefore that we can decompose the lenticular plate into a sequence of "superlenses" of which there are two superimposed in every full period. The lens 6 fades out gradually with increasing distance from the axis, as the zones belonging to it gradually decrease in width and its increasing gaps are filled out by the other "superlens" 7 or 8. If we want only one lens e. g. 6, we must not go too far from the axis. If we want to use an aperture width equal to a full period, we can utilize roughly 75% of the area. We can call this fraction the "lens efficiency." With an aperture of ⅔ of the full period the efficiency will be 89%. Sections which are not desired can be blacked out e. g. with dark paint. Methods for increasing the lens efficiency will be described later.

Whereas in this example I have produced the equivalent of dispersing lenses, it is equally simple to produce condensing lenses. This is done as shown in Fig. 3 merely by reversing the curvatures of the lenticules, or—which amounts to the same—to choose $\lambda_a:\lambda_b=5:6$ instead of 6:5 as before. The focal length of the equivalent "superlenses" is the same as before, only the sign is reversed.

Figs. 4 and 5 illustrate more general examples of lenticular systems according to the invention. Fig. 4 is a section through a lenticular sheet the thickness of which is no more negligible against the curvature radii. The optical condition to be satisfied by the curvatures is illustrated in the special case of two lenticules which are aligned in the line O—O' and form an afocal pair, in the sense that they have a common "inner" focal point $F_i$. Denoting the thickness of the plate measured between the apexes of the lenticules by $\delta$, and the "inner" focal lengths of the lenticules—i. e. the focal lengths in the medium of the plate—by $f_a$ resp. $f_b$, this conditions is:

$$f_a+f_b=\delta \qquad 1$$

The focal lengths are to be considered positive for a condensing, negative for a dispersing lenticule. Fig. 4 illustrates this condition in the case of lens curvatures of opposite sign, Fig. 5 in the case of equal signs. The condition 1 ensures that rays entering the lens in a parallel bundle will leave it also in a parallel bundle. Strictly speaking this is exactly true only for light parallel to the axis, as lenses of the simple kind as shown have curved focal surfaces which can not coincide except in certain lines. But for rays incident under a moderate angle to the perpendicular the emerging beam will still be very nearly parallel, and this remains approximately true also for lenticules which are not opposite one another. If greater perfection is desired the simple lenticular impressions may be replaced by aplanatic lens combinations.

In the following I explain in a quantitative way the optical properties of lenticular systems according to the invention, and the rules by which the same may be calculated and dimensioned for special purposes. In order to simplify the explanations, a plane transparent sheet with cylindrical impressions on both faces, as shown in Fig. 4 may be used for illustrating them. This figure contains all the necessary symbols. The plate may be in contact at the left side with a "first" medium, at the right side with a "second" medium. The refractive indices of the two media and of the plate are in turn $n_1$, $n_2$ and $n$. All quantities relating to the two outer media are marked with suffixes 1 and 2, the quantities relating to the medium of the plate have no suffix. Quantities relating to the first and second interface may have suffixes $a$ resp. $b$. For example I call the focal length of the $a$-lenticules in the first medium $f_{a1}$, in the medium of the plate $f_a$. In Fig. 4, $f_a$ and $f_b$ are understood to mean positive lengths, the negative focal length of the concave lenticules is therefore denoted by $f_b$. Equation 1 is fulfilled, as illustrated in the lower part of the figure. The rays $r_0$, which enter the convex lenticule parallel to the axis O—O' are refracted by it towards the inner focal point $F_1$, but as this is at the same time the first focal point of the concave lenticules the rays $r'_0$ produced by the second refraction will continue parallel to the axis Rays $r$, which entered the convex lenticules at an angle to the axis, will leave the concave lenticules as rays $r'_1$, again in a parallel beam, but at a different angle to the axis. I assume in the following that all angles $\alpha$ of the light rays with the perpendicular are so small that their sines can be replaced by the angles themselves.

Parallel light may fall on the plate from the left at an angle $\alpha_1$. The beam which enters through one $a$-lenticule will leave it in general through more than one $b$-lenticule, i. e. it will be split up. Let us consider a ray $r$ which has entered through an $a$-lenticule the axis of which is at a distance $y_a$ from the reference axis O—O', and leaves the plate through a $b$-lenticule with an ordinary $y_b$, the distance between the axes of said lenticules being $\Delta = y_b - y$. All the rays so specified will leave the plate in a parallel beam, with an inclination $$\alpha_2 = -\frac{f_a}{f_b}\frac{n_1}{n_2}\alpha_1 + \frac{n}{n_2}\frac{\Delta}{f_b} \qquad 2$$

This equation, which can be derived from elementary optical considerations completely describes the optical properties of a lenticular plate, but in order to demonstrate the equivalence of the plate with a number of "superlenses" we must transform the equation into a more suitable form.

I assume now for the purpose of explanation that the periods $\lambda_a$ and $\lambda_b$ are not equal, but are in a rational relation. This is expressed in a general way by the equations $$\lambda = m_a \mu \qquad \lambda = m_b \mu \qquad 3$$

where $\mu$ is a certain basic length and $m_a$ and $m_b$ are relative prime numbers. In the special case when one period is a multiple of the other, one of the numbers $m_a$ or $m_b$ becomes unity. The whole pattern will not have therefore any periodicity shorter than the "full period" P:

$$P = m_a m_b \mu = m_a \lambda_b = m_b \lambda_a \qquad 4$$

We can now express any distance $\Delta$ between an $a$ and a $b$-lenticule as follows:

$$\Delta = y_b - y_a = k_b \lambda_b - k_a \lambda_a = (k_b m_b - k_a m_a)\mu \qquad 5$$

where $k_a$ and $k_b$ are arbitrary integers.

The values of $\Delta$ as given by Eq. 5 represents a double sequence, as they depend on two arbitrary numbers $k_a$ and $k_b$. We could decompose this double sequence in various ways into simple sequences. The following way leads straight to the result.

We assume that $\lambda_a$ is larged than $\lambda_b$, (i. e. that we have chosen the symbols "$a$" and "$b$" in this way), therefore $m_a > m_b$. Let M be the smallest integer larger than $m_a/m_b$, i. e.

$$m_a = M m_b - p \qquad 6$$

where $p$ is a positive integer smaller than $m_b$. We now select from the double sequence in Eq. 5 a simple sub-sequence, in which $$k_b = M k_a + i \qquad 7$$

where $i$ is an integer. The values of $\Delta$ in this $i$-th sub sequence are $$\Delta_i = i\lambda_b + (M m_b - m_a)\lambda_a k_a = i\lambda_b + \left(M\frac{m_b}{m_a} - 1\right) y_a$$

Substituting this into Eq. 2 we obtain $$\alpha_2 = -\frac{f_a}{f_b}\frac{n_1}{n_2}\alpha_1 - \frac{n}{n_2}\left[M\frac{m_b}{m_a} - 1\right]\frac{y_a}{f_b} + i\frac{n}{n_2}\frac{\lambda_b}{f_b} \qquad 8$$

This again describes the optical behaviour of the lenticular plate completely if we give $i$ all possible integer values.

We now compare Eq. 8 with the corresponding equation of a large thin lens, shifted by a distance Y out of the axis O—O'. We call $F_2$ the focal length of this large lens in the medium 2. For reasons which will subsequently become evident we assume this large lens to be backed on the side of the medium 1 not by this medium, but by one with a refractive index $n_1$. The equation of the large lens is:

$$\alpha_2 = \frac{n'}{n_2}\alpha_1 - (y_a - Y)/F_2 \qquad 9$$

Comparing this term by term with Eq. 8 we see immediately that Eq. 8 for every given value $i$ also represents a lens, which we call a "superlens." This will have in the second medium a focal length.

$$F_2 = -\frac{n_2}{n}f_b / \left(M\frac{m_b}{m_a} - 1\right) = -f_{b2}/\left(M\frac{m_b}{m_a} - 1\right) =$$

$$= -f_{b2} m_a/p = -f_{b2} P/\lambda_b p \qquad 10$$

If $p$ as defined by Eq. 6 is small against $m_a$ the superlens will have a very long focus as compared with the focal length of the individual lenticules. These are the practically most important cases. There is however also the case to consider in which $p$ is very nearly equal to $m_b$. In this case we introduce the largest integer N, which is smaller than $M_a/m_b$, i. e. $N = M - 1$, and write $$m_a = Nm_b + q$$

where $q = m_b - p$ is small against $m_b$. In this case the calculation is formally the same, but we obtain a focal length $F_2 = f_{b2} m_a/q$. By making the ratio $m_a/m_b$ a little larger or a little smaller than an integer, it is possible to produce condensing or dispersing lenses. I have shown a simple example of this in Figs. 2 and 3. The two cases can be unified by allowing $p$ to assume values between $-\tfrac{1}{2} m_b$ and $+\tfrac{1}{2} m_b$.

Comparing the last terms of Eqs. 8 and 9 we see that the axis of the superlens can have any position $$Y_i = i\lambda_b F_2/f_{b2} = i\lambda_b/\left(M\frac{m_b}{m_a} - 1\right) = -i\lambda_b m_a/p \qquad 11$$

One of these is in the axis O—O', and the others are spaced by $$\lambda = \lambda_b m_a/p \qquad 12$$

This is the $p$-th part of the full period P, as defined in Eq. 4, i. e.

$$\lambda = P/p \qquad 13$$

The length of every lens is however 2P—as can be understood e. g. from Fig. 3—there are therefore $2p$ superlenses superimposed at every point of the lenticular plate. In the examples in Figs. 2 and 3 we had $p = \pm 1$, therefore we found two superlenses, the minimum number.

The focussing properties of a lenticular plate are illustrated in more detail in Fig. 5. In this example $m_a = 25$, $m_b = 11$. As these are relative prime numbers the full period comprises 25 of the smaller lenses or 11 of the larger ones. As $25 = 2 \times 11 + 3$ we have $p = -3$, i. e. there are three superfocusses in every full period. Two of these $\Phi_0$ and $\Phi_1$ are shown in the drawing, which illustrates also the nature of these superfocusses. At the left of the drawing a beam enters the plate parallel to the axis. Only such rays $r_0$ are shown which fall in the division lines between two lenticules. These are split up into two rays $r'$ and $r''$ each. The rays $r'$ and $r''$ cross over in the plane of the inner foci, shown by a dotted line, at a distance $f_a$ from the left boundary of the plate. From here on the elemental converging beams diverge and each leaves the plate through a number of lenticules at the right side. Each of the emerging rays passes through one of the superfocusses. Those passing through $\Phi_0$ are denoted by $r_{00}$, those passing through $\Phi_1$ by $r_{01}$, etc. It can be seen that the superfocusses are cross sections of minimum confusion. These are cross sections of minimum confusion for the narrow parallel beams leaving the lenticules, which cross over in an area of a width equal to—in some cases smaller than—the width of the lenticules on the exit side. In the case shown in the drawing the width of the lenticules is not very small as compared with the focal length $F_2$, therefore the superlenses are rather crude. If the lenticules are made very small against $F_2$ the quality of the superlenses will more and more approximate the quality of ordinary lenses.

Comparing finally the first terms of Eqs. 8 and 9, we find $$n' = -\frac{f_a}{f_b} n_1 \qquad 14$$

This means that we can imitate the optical behaviour of lenticular systems according to the invention by ordinary lenses only if we immerse the object in a medium with a refractive index $n'$. The simple case illustrated in Figs. 2 and 3 was exceptional, as we had in that case equal and opposite curvatures, i. e. $f_a = -f_b$. In the case of a plate as shown in Fig. 4, looking from the right it appears as if the medium at the left had a refractive index larger than unity, whereas looking from the left it appears as if the medium at the right had less than unit refractivity, a case which can not be imitated by the usual optical methods. The case shown in Fig. 5 departs even more from ordinary lenses. As both $f_a$ and $f_b$ are positive, this case corresponds to negative refractive indices. This means that this kind of superlens produces an upright image.

Fig. 6 illustrates the imaging properties of a lenticular plate with convex-concave lenticules—as in Fig. 4—if the convex side is turned towards the object A—B. In this case the object appears immersed in a medium with a refractive index $\nu = -f_a/f_b > 1$, i e. it appears approached to the plate to a distance $a/\nu$ if "$a$" is the real distance. Of this apparent object A'—B' the "superlenses" which are symbolically represented by the dotted arcs $S_0$, $S_1$, $S_2$, etc. which can be substituted for the plate produce an array of equidistant images $A_0$—$B_0$, $A_1$—$B_1$, $A_2$—$B_2$, etc. These images can be constructed by drawing through the centre of the apparent object A'B' and the centres of the superlenses $S_0$, $S_1$, etc., the axes $X_0$, $X_1$, etc., thus obtaining the centres of the images $A_0 B_0$, $A_1 B_1$, etc. As all images are of the same size, it suffices to construct one, by projecting it by straight lines through the centre of a superlens, as shown by the line A'A$_0$ and B'B$_0$ in the case of the central image. The peculiar properties of the lenticular plate reveal themselves in the fact that although the images are somewhat nearer to the lens than the object, yet they appear somewhat larger than the original.

In the special case $p = 0$, i. e. when one period is an exact multiple of the other, the Eqs. 10, 11 and 12 cease to be useful. This case can be more simply understood from the original Eq. 8, in which the middle term now becomes zero, as the superlenses have zero refractive power. An observer looking at an object from the second medium through the plate, will see a number of images at the same distance from the plate, displaced relatively to one another in the direction parallel to the plate, at right angles to the lenticules. All these images appear at such a distance, as if the object had been immersed in a medium with a refractive index $n'$, and if this medium were bounded by a plane boundary at the place of a lenticular plate. The plate produces therefore a multiplicity of images, but only virtual images.

The equations above given are sufficient for designing lenticular systems according to the invention for various purposes. An example may show how this may be carried out.

*Example.*—Designing a lenticular plate of 1 m.$^2$, equivalent to a single large condensing lens, with focal length as short as possible.

As we want only one effective superlens, we must choose $p$ as small as possible in absolute value, i. e. $p = \pm 1$. Next we must make a choice between the two types of lenticular plates, as shown in Fig. 4 and in Fig. 5. The convex-concave type will be in general preferable, as—all other things being equal—it has smaller thickness than the convex-convex type. This choice being made, we obtain a condensing superlens of smallest multiplicity if the number of the convex lenticules in the full period exceeds the number of the concave lenticules by one.

Next we must choose the full period. Here again we have a certain freedom of choice. If we take P so large that the prescribed linear aperture of 1 m. is only a small fraction of it, we obtain a good lens efficiency, i. e. almost the whole light can be utilized for the central or principal image, but the focal length is large. In order to obtain good lens efficiency without excessive P it is advantageous to turn the convex-concave plate with its convex side towards the light source and to take $\nu$ as large as possible. This again means that the refractive index of the plate material has to be as large as possible. The advantage of a large $\nu$ can be understood from Fig. 4. The light which falls on the whole area of the left—convex—side, leaves the plate only through a fraction of the area, and therefore beam splitting will not occur within certain limits of incidence angle, at least in the central parts of the lens, where the relative displacement of opposite lenticules is small. We choose $P=1$ m. and $\nu=2$. For parallel light falling in at right angles to the plate this gives an efficiency of 87.5%, i. e. this fraction will be concentrated in the principal focal line. The efficiency will be smaller for wider fields.

We are still entirely free to choose the number of lenticules on one side of the plate. We could e. g. choose—as in Fig. 3—5 concave and 6 convex lenticules, or 999 concave and 1000 convex ones. If the shape of the lenticules, i. e. the ratio of their curvature radii to the period and to the thickness of the plate remains constant, the "superlens" will have always the same focal length.

The question of the number of the lenticules and the thickness of the plate has to be decided as a compromise between the ideal requirements and the possibilities of manufacture. If the lenticules are made with perfect shape, the smaller they are, the more perfect will be the lens, i. e. the more will it approach an ordinary large (paraboloidal) lens. It will be however increasingly difficult to make the lenticules to perfect shape below a certain size. The decision depends also on the material of which the lenticular plate is to be made. If the plate is made of glass, its fragility will prescribe a certain minimum thickness. If however the material is a transparent plastic, such as e. g. acetylcellulose, its thickness can be much less.

The following is an instance of a numerical solution of the above example:

Material_____Polystyrene, $n=1.67$
Full period_____ $P=1000$ mms.
Plate thickness_____ $\delta=3$ mms.
Ratio of focal lengths of convex and
 concave lenticules_____ $\nu=2$

|  | Convex | Concave |
| --- | --- | --- |
| Number of lenticules | 1,000 | 999 |
| Curvature radius of lenticules_____mms__ | 2.4 | 1.2 |
| Focal length of lenticules in plate_____do__ | 6 | 3 |
| Focal length of lenticules in air_____do__ | 3.6 | 1.8 |
| Aperture ratio of lenticules in air_____do__ | .275 | .550 |

Focal length of superlens on convex side_____mms__ 3600
Focal length of superlens on concave side_____mms__ 1800

This plate is particularly suitable for concentrating parallel light, e. g. solar radiation. The plate is turned with its convex lenticules towards the sun, and the solar energy can be utilized in the focal line at 1.8 meters from the plate, e. g. for heating a liquid in a tubular boiler.

If the energy has to be concentrated—approximately—in a point, two plates of the same kind may be used, with their lenticules at right angles to one another, close together, both turned with their convex lenticules towards the sun. This arrangement is shown in Fig. 7, in which 9 and 10 are the two lenticular plates. Their combination is equivalent to a lens with rotational symmetry. Such a superlens could be obtained also by using one plate of the same specification, but with concentric toroidal lenticules instead of cylindrical ones. It is however much easier to make two cylindrical lenticular plates than one toroidal plate, and it is evident that two crossed plates will give a very good approximation to a rotational "superlens," as their thickness, and therefore their mutual distance can be made very small against the focal length.

The above numerical example of a lenticular plate is somewhat less suitable for the conversion of a diverging into a parallel beam, e. g. for use in a lighthouse. Again in order to obtain good "lens efficiency" the convex side of the lenticules must be turned towards the light source, i. e. the light source must be placed in the focus on the convex side, at a distance of 3.6 meters from the plate. In order to obtain a focal length of 1.8 meters, two plates with parallel lenticules must be used, close together. In order to concentrate the light also in the other direction, one or two more plates of the same kind must be arranged at right angles to the others. In lighthouses it is often desired to produce a fan-shaped beam, with a certain divergence in horizontal direction. If in the above example we use two plates with horizontal lenticules and one with vertical ruling, at 1.8 meters from the arc, the rays in vertical planes passing through the light source will leave the said combination of plates parallel to one another, whilst horizontally the fan will have a divergence of about 16°.

It is however preferable in such applications to use plates with a smaller $\nu$ than in the above numerical example, i. e. plates more approaching the simple case shown in Fig. 3.

Lenticular plates according to the invention can be manufactured particularly easily by moulding of transparent plastic materials, which can be plastically deformed at a not too high temperature, so that the high polish of the mould does not suffer by repeated use. The plastic material assumes the shape and finish of the mould perfectly, no subsequent grinding or polishing is necessary. Large lenticular plates as the one in the numerical example may be assembled out of a number of ribbons of e. g. 2–5 cms. width, which are shaped by rolling between two profiled rollers, set to an accurate distance and accurately geared with one another. But it is also possible to make up the plate out of small sheets of e. g. 10 x 10 cms., with only two moulding plates of the same size. These must be set in jig so as to produce exactly the desired thickness. In moulding different parts of the plate—at different distances from the axis at right angles to the lenticules—one plate is progressively advanced relatively to the other by a certain fraction of the period. In assembling these ribbons or rectangular sheets no excessive precision is necessary. It is not necessary to align the individual lenticules, nor is it necessary to position the sheets in such a way that the lenticules on either side form an accurate equidistant array, as every lenticule on one side of a sheet will co-operate only with the lenticules on the other side of the same sheet. The sheets or ribbons may be assembled e. g. between two glass plates, or in suitable metal frames.

In the foregoing explanations I have assumed for the sake of simplicity that the plates are plane and the periods equal throughout the plate. It may be however understood that the plates or sheets may be cylindrically or spherically curved without departing from the scope and spirit of the invention, and that the periods may be unequal. Curvature produces additional lens effects, which can be easily understood from the foregoing explanations, as they will be similar to those produced by a curved boundary between two media with refractive indices in the ratio $\nu$. Small progressive variations of the periods from the centre outwards may be advantageously used for giving the superlenses other than the parabolical or paraboloidal character of plane lenticular plates with constant periods. In particular it is possible to imitate in this way spherical and other lens shapes, as known in the optical art.

Figs. 8–10 show examples of lenticular systems according to the invention in which one set of lenticules serve as reflecting elements. By means of these systems optical effects can be produced similar to those of larger concave or convex, cylindrical or spherical mirrors. A reflecting lenticular plate will be in general equivalent to a number of "supermirrors" which produce a multiplicity of images shifted relatively to one another. In many applications it is desirable to suppress all but one of these images. On the other hand reflecting lenticular plates producing a great number of images of a single object are particularly suitable as projection screens or parts of projection screens in my system of stereoscopic moving pictures as specified in two co-pending applications.

Fig. 8 is an example of a reflecting lenticular plate according to the invention. In order to maintain the condition that rays which enter the plate in a parallel beam will also leave it in one or more parallel beams, the former optical condition must be modified as follows: The reflecting or rear lenticules must image the plane of the inner foci of the transmitting or front lenticules in itself. In other words, the "spherical points" or lines of the rear lenticule system must be contained in the same plane as the inner foci or focal lines of the frontal system. Denoting the front system with the suffix $a$ and the rear system with $b$, Eq. 1 must be therefore modified as follows:

$$f_a + 2f_b = \delta \qquad 15$$

The same condition holds if instead of making the rear lenticules specular as in Fig. 8, we use transmitting lenticules and back them with a plane mirror.

The theory above developed for transmitting plates can be applied also mutatis mutandis to the specular plate. We denote the medium at the front side with $O$, and quantities relating to this medium by the suffix $o$. The focal length of the "supermirror" becomes $$F_o = +\tfrac{1}{2}f_{ao}/\left(M\tfrac{m_b}{m_a}-1\right) = \tfrac{1}{2}f_{ao}m_a/p = \tfrac{1}{2}f_{ao}P/\lambda_a p \qquad 16$$

This differs from the corresponding Eq. 10 in a factor $-\tfrac{1}{2}$, and by the substitution of $f_a$ for $f_b$, as the light leaves the plate now through the same face $a$ through which it enters. For the same reason the apparent refractive index of a specular plate is always unity. An object will be always imaged with a magnification equal to the ratio of image distance to object distance.

In the special case when the period on one side is an exact multiple of the other we obtain a number of mirror images of the object, at the same distance behind the plate as the object is before the plate, but shifted relatively to one another, parallel to the plate, at right angles to the lenticules. We can term this a "multiple plane mirror."

An essential difference between transmitting and reflecting lenticular plates is, that in the latter case three lenticules will take part in producing the beams into which the incident beam is split up, viz. the $a$-lenticule through which the rays enter, the $b$-lenticule at which it is reflected, and the $a$-lenticule through which it leaves the plate. This is illustrated in Fig. 8. A parallel beam $r$ enters through the $a$-lenticule 11, which focusses it in X. After passing X it is reflected and split by the $b$-mirrors 12, 13 and 14, which form images $Y_1$, $Y_2$ and $Y_3$ of X in the plane C, shown by a dotted line which passes through their curvature centres. The partial beam which was reflected at 12 emerges as a parallel beam $r_{e1}$ through the $a$-lenticule 15, the beam reflected at 14 as a parallel beam $r_{e3}$ through 17. The beam reflected at 13 is split again at the front, as it passes partly through 11, partly through 16, into two parallel beams $r_{e1}'$ and $r_{e2}''$. In the expression corresponding to Eq. 11 for the position of the axes of the "supermirrors" there appears instead of $i\lambda_b$ an expression $$2i\lambda_b + j\lambda_a \qquad 17$$

Here the integer $i$—defined by Eq. 6—specifies the rear lenticule at which the reflection takes place, whereas the integer $j$ specifies the $a$-lenticule through which the ray leaves the plate. $j$ may be counted from the lenticule through which the ray has entered the plate, so that $j=0$ if the ray falls in and leaves through the same lenticule.

This means that in the case of the specular plate the supermirrors themselves form a double sequence, with two periods proportional to $2\lambda_b$ and $\lambda_a$, respectively. This is a simple sequence if $\lambda_b$ and $\lambda_a$ are in a rational relation, as expressed by Eq. 3, but the common period $\mu$—or $2\mu$ if $m_b$ is odd and $m_a$ an even number—will be exceedingly small. If it is desired to produce only a single series of images—as e. g. if the specular plate is used as part of a projection screen for stereoscopic pictures according to the copending application—one or the other of the periodicities contained in the expression 17 must be suppressed.

It is more advantageous to suppress the multiplicity arising from beam-splitting at the rear mirrors. How this may be done is shown in Fig. 9. The focal length of the front lenticules is chosen much larger than the curvature radius $r_b = 2f_b$ of the rear mirrors, although for reasons of clarity the ratio is not shown as large in the drawing as it would be in practical applications. On the other hand the rear period $\lambda_b$ is chosen about as large or even larger than the front period $\lambda_a$. In the figure a parallel incident beam $r_i$ is focussed by a front lenticule in X. If the plate were transparent, the beam would strike only a small fraction of a mirror, as shown by the dotted beam $r_i'$, and beam splitting at the back could be entirely suppressed. By this however the number of images is reduced to not more than two, for the following reason. The beam which entered through one lenticle strikes the front face on its return again in a zone of the width $\lambda_a$, i. e. it can not strike more than two lenticules at a time. Lenticular plates in which every beam strikes the rear face only in a fraction of the rear period are therefore particularly useful if it is desired to produce one, or at the utmost two images of an object.

In other applications, in which a large number of images is desired—particularly in projection screens according to the co-pending application Serial No. 350,804—this is a disadvantage. This can be overcome, as shown in Fig. 9, by making the plate of two parts, 18 and 19, divided at the plane of the inner foci, and making the interface 20 diffusing, e. g. by frosting, or preferably by a system of finely ruled lines. The beam $r_1$ now strikes the rear face in a wider zone—as shown in Fig. 9 in continuous lines—but still does not cover more than one, or at the most two or three rear mirrors. At the return however it broadens out even more, and due to the large distance $f_a$ it leaves the plate through a large number, e. g. 30–60 or even more lenticules. In the figure four emerging beams $r_e'$, $r_e''$, $r_e'''$ and $r_e''''$ are shown. In this way we can obtain therefore the large multiplicities required.

Fig. 10 shows the imaging properties of such a reflecting plate. Here again for the purpose of explanation the front period $\lambda_a$ is shown relatively much larger than suitable for applications of this system in the projection screens of cinema theatres according to the co-pending application. Only rays through the apexes of the front lenticules are shown, and for simplicity these are shown unbroken, as if the object point A and its images were in a medium with the same refractive index as the plate. Three incident rays of this kind are shown, viz. $r_{00}$, which is in the symmetry plane of the plate, $r_{11}$ and $r_{12}$. It can be seen that the curvature centres C lag progressively behind the points $F_A$ in which the incident rays are focussed, and therefore the rays $r_1^0$ and $r_2^0$ which return through the same lenticule through which they entered will form smaller angles with the perpendicular, i. e. they will intersect in an image $A_0$ of A, at a larger distance than A. Side images $A_1$, $A_2$ . . . will be formed by rays $r_1'$ and $r_2'$, $r_1^2$ and $r_2^2$, which do not return through the same lenticules.

What I claim as new and desire to secure by Letters Patent of the United States is:

An optical system, consisting of a sheet of transparent material, embossed at both sides with cylindrical impressions parallel to the same direction, forming two arrays with different spacings, the sum of the focal lengths of any two opposing lenticules being equal to the thickness of the sheet.

DENNIS GABOR.